US012716013B2

(12) United States Patent
Saija et al.

(10) Patent No.: US 12,716,013 B2
(45) Date of Patent: Aug. 25, 2026

(54) PRESSURE-SENSITIVE ADHESIVE COMPOSITIONS AND RELATED AQUEOUS POLYMER DISPERSIONS

(71) Applicant: Arkema France, Colombes (FR)

(72) Inventors: Leo Mario Saija, Boretto (IT); Mario Lugli, Boretto (IT); Simona Ferretti, Beretto (IT); Andrea Premoli, Boretto (IT)

(73) Assignee: Arkema France, Puteaux (FR)

( * ) Notice: Subject to any disclaimer, the term of this patent is extended or adjusted under 35 U.S.C. 154(b) by 564 days.

(21) Appl. No.: 17/293,590

(22) PCT Filed: Nov. 13, 2019

(86) PCT No.: PCT/EP2019/081122
§ 371 (c)(1),
(2) Date: May 13, 2021

(87) PCT Pub. No.: WO2020/099459
PCT Pub. Date: May 22, 2020

(65) Prior Publication Data

US 2022/0119684 A1 Apr. 21, 2022

(30) Foreign Application Priority Data

Nov. 15, 2018 (EP) .................................... 18206497

(51) Int. Cl.

| | |
|---|---|
| ***C09J 7/38*** | (2018.01) |
| ***C08F 2/38*** | (2006.01) |
| ***C08F 212/08*** | (2006.01) |
| ***C08F 218/08*** | (2006.01) |
| ***C08F 220/06*** | (2006.01) |
| ***C08F 220/18*** | (2006.01) |

(52) U.S. Cl.
CPC ................ *C09J 7/385* (2018.01); *C08F 2/38* (2013.01); *C08F 212/08* (2013.01); *C08F 218/08* (2013.01); *C08F 220/06* (2013.01); *C08F 220/1804* (2020.02); *C08F 220/1808* (2020.02); *C09J 2203/334* (2013.01); *C09J 2433/00* (2013.01)

(58) Field of Classification Search
CPC .......... C08F 220/1808; C08F 220/1804; C08F 218/08; C08F 212/08; C08F 220/20; C08F 220/06; C09J 7/385; C09J 133/08; C09J 133/10; C09J 133/14; C09J 2201/54; C09J 2203/334; C09J 2433/00; C09J 2301/302
See application file for complete search history.

(56) References Cited

U.S. PATENT DOCUMENTS

| | | | | |
|---|---|---|---|---|
| 5,623,011 | A | 4/1997 | Bernard | |
| 6,214,925 | B1 | 4/2001 | Schuler et al. | |
| 6,620,870 | B1 | 9/2003 | Gerst et al. | |
| 6,927,267 | B1 * | 8/2005 | Varela de la Rosa | C08F 220/12 526/287 |
| 9,976,060 | B2 | 5/2018 | Dimmer et al. | |
| 11,359,118 | B2 * | 6/2022 | Lee | C09J 7/385 |
| 2006/0024263 | A1 | 2/2006 | Van Es et al. | |
| 2006/0100357 | A1 | 5/2006 | Bunn et al. | |
| 2010/0092774 | A1 | 4/2010 | Schoecker et al. | |
| 2012/0276380 | A1 * | 11/2012 | Traser | C09J 133/08 977/773 |
| 2014/0142238 | A1 * | 5/2014 | Guo | C09J 133/14 524/521 |

FOREIGN PATENT DOCUMENTS

| | | | | |
|---|---|---|---|---|
| EP | 1342762 | A2 * | 9/2003 | C08F 220/12 |
| JP | S6053552 | | 3/1985 | |
| TW | 200846439 | A | 12/2008 | |
| TW | 201829694 | A | 8/2018 | |
| WO | WO 2016/000938 | A1 | 1/2016 | |
| WO | WO16204154 | A1 | 12/2016 | |

* cited by examiner

*Primary Examiner* — Scott R. Walshon
(74) *Attorney, Agent, or Firm* — Debodhonyaa Sengupta

(57) ABSTRACT

A pressure sensitive adhesive comprising an aqueous polymer dispersion which comprises at least one polymer with monomeric units from a monomeric composition comprising (by weight): a) 60 to 95% of 2-ethylhexyl acrylate; b) 0.1 to 15% of butyl (meth)acrylate; c) 0.5 to 5% of a vinyl aromatic monomer; d) 0.1 to 4% of at least one ethylenically unsaturated acid; e) 0 to 20% of a vinylic ester of C2-C8 carboxylic acid; f) optionally, a monomer different from a), b), c), d) and e); g) at least 0.005% with respect to the total weight of monomers a)+b)+c)+d)+e)+f) of at least one chain transfer agent; the sum of a)+b)+c)+d)+e)+f) being equal to 100%, wherein said monomeric composition does not comprise any C1-C2 alkyl (meth)acrylate.

7 Claims, No Drawings

PRESSURE-SENSITIVE ADHESIVE COMPOSITIONS AND RELATED AQUEOUS POLYMER DISPERSIONS

CROSS-REFERENCE TO RELATED APPLICATIONS

This application is a national stage application under 35 U.S.C. § 371 of PCT/EP2019/081122, filed Nov. 13, 2019 which claims benefit to application EP 18206497.2, filed Nov. 15, 2018.

The present invention relates to an adhesive material with enhanced adhesion properties, especially when used in cold environment. This material contains an aqueous polymeric dispersion produced by using a specific monomeric mixture composition.

The monomer mixture object of the present invention is composed mainly by 2-Ethyl hexyl acrylate and minor amounts of n-butyl methacrylate, vinyl aromatic monomers like styrene, vinyl ester of $C_2$-$C_{12}$ carboxylic acid, ethylenically unsaturated carboxylic acid and optionally other different monomers but excluding esters of $C_1$-$C_2$ (meth) acrylates. In the present composition, a chain transfer agent is used to control the molecular weight.

BACKGROUND

WO 2016000938 discloses a pressure-sensitive adhesive polymer composition which is formed by 50-95% by weight of 2-ethylhexyl acrylate, 1-25% by weight of at least one monomer selected from $C_1$ to $C_2$ alkyl (meth)acrylates, 1-10% by weight of styrene, 0.1-5% by weight of at least one ethylenically unsaturated acid or acid anhydride, 0 to 10% by weight of other ethylenics monomers and a molecular weight regulator in an amount of at least 0.01 part by weight per 100 parts by weight of monomers. This specific composition is particularly suitable to improve adhesion on cold and moist surface.

US 2010/0092774 discloses a pressure-sensitive adhesive polymer composed by 70% to 95% of a $C_6$ to $C_{10}$ alkyl (meth)acrylate, 1% to 20% by weight of methyl methacrylate, 0.5% to 10% by weight of a vinyl aromatic monomer, 0.5% to 10% by weight of a hydroxyalkyl (meth)acrylate, 0.5% to 5% by weight of a monomer having at least one acid or acid anhydride group, 0% to 10% by weight of tert-butyl (meth)acrylate and 0% to 20% by weight of other monomers, said other monomers comprising not more than 3% by weight of methyl acrylate. The advantage provided by this specific composition is the production of label showing good adhesion properties even at low temperature keeping sufficient cohesion for a clean slitting and die cutting.

U.S. Pat. No. 6,214,925 discloses a polymer composed from a) 50 to 99.98% by weight of a $C_1$-$C_{12}$ alkyl (meth) acrylate b) from 0.02 to 1.8% by weight of a vinyl-aromatic compound c) from 0 to 10% by weight of an ethylenically unsaturated acid or anhydride and d) from 0 to 40% by weight of other monomers. According to a preferred embodiment, monomer a) includes a1) $C_1$-$C_2$-alkyl (meth) acrylate in addition to a2) $C_3$-$C_{12}$-alkyl (meth)acrylates. These adhesives are produced by emulsion polymerization and show adhesive performances with a good compromise between tack, adhesion and cohesion. In all examples, a $C_1$-$C_2$-alkyl (meth)acrylate is used.

US 20060100357 discloses an adhesive composed of an acrylic aqueous polymer emulsion comprising, as copolymerized units, from 0.25% to 99.75% by weight of monoethylenically unsaturated nonionic (meth)acrylic monomer, from 0.40% to 99.75% by weight, based on dry polymer weight of one or more ethylenically unsaturated surfactant monomers and from 0.25% to 10% by weight of monoethylenically unsaturated acid monomer, said polymer having a Tg of −100° C. to 40° C. Said pressure sensitive adhesive composition adheres to low energy and high energy substrates over a broad range of high to low temperature.

U.S. Pat. No. 5,623,011 discloses an adhesive system comprising an emulsion pressure-sensitive adhesive polymer and 5 to 25 parts by weight per 100 parts of said polymer of a tackifier having an acid number from about 30 to about 60 and a softening point of from about 50 to about 70° C. The pressure-sensitive adhesive polymers used in the present invention have a Tg of less than about −30° C. and a gel content of from about 50 to about 70% by weight of the polymer and containing about 35 to about 60% by weight of at least one alkyl acrylate (more preferably, a mixture of alkyl acrylates) containing from about 4 to about 8 carbon atoms in the alkyl group; about 15 to about 35% by weight (more preferably, about 15 to 20% by weight) of at least one vinyl ester from about 2 to about 16 carbon atoms in the alkyl chain of the ester; about 15 to about 35% of at least one diester of an unsaturated dicarboxylic acid, wherein each alkyl group of the diester independently contains from about 6 to about 12 carbon atoms; and up to about 5% by weight (more preferably, about 1 to about 3%) of an unsaturated carboxylic acid containing from about 3 to about 5 carbon atoms. The resulting adhesive systems show good adhesion at temperatures as low as −4° C. maintaining sufficient level of cohesion.

The pressure-sensitive adhesive composition of the present invention surprisingly shows a good compromise between adhesion and cohesion, without using in the monomeric composition a $C_1$-$C_2$ (meth)acrylate or a monomer containing sulfonic groups or a polymerizable surfactants and/or a diester of an unsaturated dicarboxylic acid.

Moreover, the adhesive system resulting from the aqueous polymer dispersion with the specific monomeric composition of the present invention when applied to substrates at low temperatures, as low −10° C. shows good values of tack (loop tack).

DETAILED DESCRIPTION

The first subject of the present invention relates to a pressure-sensitive adhesive (also called PSA) composition comprising an aqueous polymer dispersion with said polymer having a specific monomeric composition based on 2-ethyl hexyl acrylate and other specific monomers in specific proportions, without any $C_1$-$C_2$ alkyl (meth)acrylates nor any monomer containing sulfonic groups nor any polymerizable surfactant nor any diester of an unsaturated dicarboxylic acid.

A second subject of the invention relates to an aqueous polymer dispersion as defined above in said PSA composition.

It is also part of the invention the use of said aqueous polymer dispersion in in adhesives or in sealants, in particular in adhesives, preferably in pressure sensitive adhesive compositions.

Another subject of the invention relates to the use of said PSA composition in adhesive labels and self-adhesive articles.

A final subject of the invention relates to a pressure-sensitive self-adhesive article, which results from the use of the PSA composition of the invention or from the use of the aqueous polymer dispersion of the invention.

The term “low temperature” according to the present invention means a temperature which is lower than 10° C., preferably lower than 5° C. and more preferably not higher than −10° C.

The term “cold/moist conditions” according to the present invention means a temperature lower than 10° C. and relative humidity of more than 60%.

So, the first subject of the present invention relates to a pressure sensitive adhesive composition, which comprises an aqueous polymer dispersion with said polymer comprising monomeric units from the polymerization of a monomeric composition comprising:

a) 60 to 95%, preferably from 75 to 95% by weight of 2-ethylhexyl acrylate,
b) 0.1 to 15%, preferably from 2 to 10% by weight of butyl (meth)acrylate,
c) 0.5 to 5%, preferably from 0.5 to 3% by weight of a vinyl aromatic monomer,
d) 0.1 to 4%, preferably 0.1 to 2% by weight of at least one ethylenically unsaturated acid,
e) 0 to 20%, preferably from 1 to 8% by weight of a vinylic ester of $C_2$-$C_8$ carboxylic acid,
f) optionally, a monomer different from a), b), c), d) and e) as defined above,
g) at least 0.005% by weight with respect to the total weight of monomers a)+b)+c)+d)+e)+f) of at least one chain transfer agent the sum of a)+b)+c)+d)+e)+f) being equal to 100% and with the proviso that said monomeric composition does not comprise any $C_1$-$C_2$ alkyl (meth)acrylate nor any monomer containing sulfonic groups nor any polymerizable surfactant nor any diester of an unsaturated dicarboxylic acid.

More particularly, said butyl (meth)acrylate is n-butyl methacrylate.

According to another particular embodiment of the invention, said vinyl aromatic monomer is styrene or styrenic monomers such as, for example, styrene, alphamethylstyrene, vinyl naphthalenes, vinyl toluenes, chloromethyl styrene.

According to another particular option, said ethylenically unsaturated acid d) is (meth)acrylic acid, meaning methacrylic or acrylic acid, or itaconic acid and preferably d) is acrylic acid.

According to another particular option, said vinylic ester e) is vinyl acetate or vinyl esters of versatic acids or other $C_3$-$C_{12}$ acids, preferably vinyl acetate.

Suitable examples of such monomer f) are hydroxylated monomers (comonomers) such as hydroxyalkyl (meth)acrylates, preferably selected from hydroxy ethyl and hydroxyl propyl (meth)acrylates and more particularly hydroxy ethyl acrylate (HEA), hydroxy ethyl methacrylate (HEMA), hydroxypropyl acrylate (HPA) or hydroxypropyl methacrylate (HPMA); lauryl methacrylate; lauryl acrylate; glycidyl methacrylate; allyl methacrylate; acetoacetoxyethyl methacrylate; acetoacetoxyethyl acrylate; acetoacetoxypropyl methacrylate; acetoacetoxyproprylacrylate; hydroxybutenyl methacrylate; allylic monomers such as allyl or diallyl ester of maleic acid and poly(allyl glycidyl ether); alkyl crotonates; acrylonitrile; diacetoneacrylamide; acrylamide; methacrylamide; N-methylol(meth)acrylamide; nitrogen containing monomers, including t-butyl aminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethylacrylate, N-(2-methacryloyloxyethyl)ethylene urea and methacrylamidoethylethylene urea; alkoxy silane monomers like vinyl triethoxy ethyl silane or gamma-methacryloxypropyl trimethoxysilane.

Regarding said transfer agent g), it may be selected from mercaptans, preferably n-alkane thiols in $C_6$ to $C_{16}$. More preferably, said transfer agent g) is n-dodecyl mercaptan.

Regarding the content of said transfer agent g), it is present at a preferred content of from 0.005 to 0.2% by weight meaning with respect to the total weight of the monomers as defined above.

A conventional surfactant or a combination of surfactants may be used as a stabilizer in the emulsion polymerization of the invention. Generally, the surfactant is at least one selected from the group consisting of anionic surfactants and/or non-ionic surfactants. Examples of preferred surfactants include, but are not limited to, alkyl diphenyl oxide di sulfonate salts, alkali or ammonium salts of alkyl sulfate, alkyl aryl sulfate, alkyl ether sulfate, alkylsulfonic acid, fatty acid which may be an ethoxylated fatty acid, $C_{10}$-$C_{18}$ ethoxylated alcohol, sulfosuccinates derivatives, phosphate mono and diester or any combination thereof. A list of suitable surfactants is available in the book “Surfactants and Polymers in Aqueous solutions” (Holmberg et al., 2002, John Wiley & Sons).

The pressure-sensitive adhesive composition according to the invention comprises besides the said aqueous polymer dispersion at least one tackifier resin and optionally other constituents which are of additives, such as wetting agents, thickeners, preferably associative thickeners, defoamers, crosslinkers fillers, colorants, leveling agents, plasticizers, pigments. etc.

More particularly, said pressure-sensitive adhesive composition contains

A) 60-95 parts by weight of solids of said aqueous polymer dispersion as defined above
B) 5-40 parts by weight of solids of at least one tackifier resin and optionally
C) 0-10 parts by weight per 100 parts of A)+B) of additives, such as wetting agents, thickeners, preferably associative thickeners, defoamers, crosslinkers fillers, colorants, leveling agents, plasticizers, pigments.

The second subject of the invention relates to said aqueous polymer dispersion itself as defined above according to the present invention. It is reminded that, according to the definition of the present invention, said aqueous polymer dispersion is based on a polymer comprising monomeric units from the polymerization of a monomeric composition comprising:

a) 60 to 95%, preferably from 75 to 95% by weight of 2-ethylhexyl acrylate,
b) 0.1 to 15%, preferably from 2 to 10% by weight of butyl (meth)acrylate,
c) 0.5 to 5%, preferably from 0.5 to 3% by weight of a vinyl aromatic monomer,
d) 0.1 to 4%, preferably 0.1 to 2% by weight of at least one ethylenically unsaturated acid,
e) 0 to 20%, preferably from 1 to 8% by weight of a vinylic ester of $C_2$-$C_8$ carboxylic acid,
f) optionally, a monomer different from a), b), c), d) and e) as defined above,
g) at least 0.005% by weight with respect to the total weight of monomers a)+b)+c)+d)+e)+f) of at least one chain transfer agent the sum of a)+b)+c)+d)+e)+f) being equal to 100% and with the proviso that said monomeric composition does not comprise any $C_1$-$C_2$ alkyl (meth)acrylate nor any monomer containing sulfonic groups nor any polymerizable surfactant nor any diester of an unsaturated dicarboxylic acid.

Said aqueous polymer dispersion of the present invention is prepared by a standard emulsion polymerization process with continuous addition of the pre-emulsified monomeric composition comprising an emulsifying system, to an aqueous solution of an emulsion initiator system, such as based on ammonium, sodium or potassium persulfate initiator. Red/ox (redox) initiator system can also be used for low polymerization temperatures, for example using ammonium or sodium persulfate combined with sodium metabisulfite as reducer.

Said process may comprise a seed polymerization with a seed part of the pre-emulsion of the monomers ranging from 0.05 to 10% by weight of the total weight of monomers or said process may be without a seed polymerization.

The polymerization may be carried out at a temperature from 30 to 120° C., preferably from 60 to 100° C.

The polymerization process may be a multistage emulsion polymerization process with at least two steps of polymerization of successively two different monomeric compositions. Depending on the chemical nature of the initiator system and the kind of polymerization process, the initiators can be added into the reactor, continuously or stepwise in the course of the free radical aqueous emulsion polymerization. Normally, it is preferred to add a portion of them initially and then the remainder is fed into the reactor according to the monomers feed. At the end of the monomer feed, the residual monomers can be removed by a treatment with a further amount of the same initiators, alternatively a redox couple composed by an organic hydroperoxide with other reducing agents or by a stripping treatment under vacuum or with steam can be applied.

During the emulsion polymerization, chain regulators such as mercaptans may be used for controlling the chain molecular weight of the resulting polymer. Examples of suitable mercaptans are n-dodecyl mercaptan (n-ddm) or tert-dodecyl mercaptan (tert-ddm). According to a particular option, when the targeted solids content is higher than 60%, a bimodal or polymodal particle size distribution is specifically targeted for reducing viscosity. For example, it is possible to create a new generation of particles by adding a seed. Further conditions for a polymodal distribution can be found in WO 02/092637.

The pH of the polymer dispersion may be adjusted in a pH range between 3.5 to 8.5.

The glass transition temperature (Tg) of the pressure-sensitive adhesive polymer is preferably less than 0° C., preferably comprised between −60 to −10° C. and very particularly preferably from −60 to −20° C. The glass transition temperature can be determined by differential scanning calorimetry (for example, ASTM 3418/82, "mid-point temperatures") at heating rate of 20° C./min.

The pressure sensitive adhesive may only consist of the aqueous polymer dispersion of the invention. However, the pressure sensitive adhesive may also further contain tackifier resins (tackifying resins) and optionally further additives, for example fillers, colorants, leveling agents, thickeners, preferably associative thickeners, defoamers, crosslinkers, plasticizers, pigments, wetting agents. Tackifiers are well described in "Technology of Pressure-Sensitive Adhesives and Products" ("Pressure-Sensitive Adhesives and Applications", second edition 2004, Benedek pag. 187-189, 2004). The pressure-sensitive adhesives composition may further contain a certain amount of surfactants like fatty alcohol ethoxylates, ethoxylated and/or propoxylated dialkyl sodium sulfosuccinates or sodium dodecylsulfonates in order to improve the wetting of hydrophobic surfaces (as wetting agent) and defoamer.

Preferably, the pressure sensitive adhesive has the following composition

A) 60-95 parts by weight of aqueous polymer dispersion,
B) 5-40 parts by weight of tackifiers and optionally
C) 0-10 parts by weight of additives, such as wetting agents, thickeners, defoamers, crosslinkers, etc.

As suitable examples of tackifiers, there are natural resins, such as rosin and its derivatives formed by disproportionation, isomerization or polymerization, terpenes and modified terpenes, aliphatic, cycloaliphatic and aromatic hydrocarbon resins ($C_5$ aliphatic resins, $C_9$ aromatic resins and $C_5/C_9$ aliphatic/aromatic hydrocarbon resins), hydrogenated hydrocarbon resins and their mixtures.

Preferred tackifiers are natural or chemically modified rosins. Rosins consist for the most part of acid derivatives of abietic acid. The tackifiers can be added easily to the polymer dispersion. Preferably, the tackifiers are used in the form of an aqueous dispersion. The amount by weight of the tackifiers is preferably from 5 to 100 parts by weight, particularly preferably 10 to 40 parts by weight related to 100 parts by weight of polymer (solids/solids).

Another subject of the present invention relates to the use of said aqueous polymer dispersion in adhesives or in sealants, in particular in adhesives, more particularly for use at low temperature, preferably in pressure sensitive adhesives, in particular for use at low temperature and more preferably in pressure sensitive self-adhesive articles, in particular for use at low temperature, more particularly at cold/moist conditions.

Another subject of the invention relates to the use of said pressure sensitive adhesive composition as defined above according to the invention in self-adhesive articles, in particular for use at low temperature. More particularly, said use is for adhesive labels which are adhesive paper labels for polar or non-polar substrates. Even more particularly, said use is for use on substrates at low temperature storage, in particular at cold/moist conditions. More preferably, said substrates are glass, in particular glass bottles. Said use may also relate to non-polar substrates selected from food packaging and food containers, for long storage at low temperature.

Finally, is part of the invention a pressure sensitive self-adhesive article, which results from the use of the pressure-sensitive adhesive composition as defined above according to the invention or from the use of the aqueous polymer dispersion as also defined above according to the invention. Said pressure sensitive self-adhesive article is more particularly an adhesive label, an adhesive tape or an adhesive film. More preferably, said adhesive label is a paper adhesive label.

The pressure-sensitive adhesive composition or the aqueous polymer dispersion can be used for producing PSA adhesive labels or other self-adhesive articles. The articles are coated with the pressure sensitive adhesive composition. Optionally, the self-adhesive articles after bonding can be again removable. The self-adhesive articles may be for example films, tapes or labels. Suitable support materials are, for example, paper, plastic films and metal foils. The inventive self-adhesive tapes may be single or double-coated tapes of the above substrates. Particularly preferred are self-adhesive labels. The inventive self-adhesive labels may be labels of paper or of thermoplastic film. The thermoplastic films for example could be films made of polyolefins (eg, polyethylene, polypropylene), films made of polyesters (eg, polyethylene terephthalate) or polyacetate. The surfaces of the thermoplastic polymer films are preferably corona treated. Preferred substrates for self-adhesive articles are paper or polymer films. Particularly preferred self-adhesive articles are paper labels. The self-adhesive articles are at least partially coated on at least one surface with a pressure sensitive adhesive composition according to the invention. The adhesive may be coated on the article by customary methods such as curtain coating, rolling, knife coating or brushing. The application amount is preferably 0.1 to 30 g/m$^2$, particularly preferably 2 to 20 g of solids per m$^2$. After the application, in general, a drying step follows to remove the water or the solvent. Water may be removed by drying at, for example 50 to 150° C. The coated substrates thus obtained, can be used as self-adhesive products (articles) such as labels, tapes or films. For subsequent use, the PSA-coated side of the substrates can be laminated with a release paper, being for example a siliconized paper. The soft self-adhesive articles may be advantageously applied for example on metal, wood, glass, paper or plastic. Preferred substrates are self-adhesive labels, in particular self-adhesive paper labels and self-adhesive film labels. The carrier materials are paper or plastic film and have a first surface and a second surface, said first surface being self-adhesive and is at least partially coated with an inventive pressure-sensitive adhesive and wherein the second surface may be printed or colored. The dyeing may be done, for example, by a colored coating-with pigments or dyes, having been produced by printing or in color thermal paper by heat.

The following examples in the experimental part below, are given for the purpose of illustrating the invention and its performances and they do not at all limit the scope of the invention.

EXPERIMENTAL PART

1) Raw Materials Used for the Aqueous Dispersions and Resulting PSA

TABLE 1 raw materials used in the examples

| Raw material | Supplier | Symbols used |
|---|---|---|
| sodium metabisulfite | Brentagg | |
| tert-butyl hydroperoxide | Arkema | |
| sodium persulphate | Peroxitalia | |
| CALFAX ® DB45 | Pilot | |
| Aerosol ® GPG | Solvay | |
| Rhodapex ® LA 120S | Solvay | |
| vinyl acetate | Lyondell | VA |
| ethyl acrylate | Arkema | EA |
| 2-ethylhexyl acrylate | Arkema | EHA |
| methyl methacrylate | Arkema | MMA |
| butyl methacrylate | Evonik | BMA |
| styrene | Versalis | S |
| 2-hydroxyethyl methacrylate | Evonik | HEMA |
| acrylic acid | Arkema | AA |
| N-dodecylmercaptan | Arkema | n-DM |
| Takolyn ® 3519 | Eastmann | Tackifier resin |

2) Aqueous Polymer Dispersions Examined and Preparation

Example 1 (Comparative)

1800 g of deionized water are added in a glass reactor fitted with a condenser, a stirrer, a temperature control system and inlets for nitrogen, the initiator solutions and the pre-emulsion feed, respectively. A monomer pre-emulsion composed of 811 g of deionized water, of 48 g of Rhodapex® LA 120S, 50 g of CALFAX® DB45, 33 g of Aerosol® GPG and 4472 g of the monomeric mixture of the composition of row 1 in table 2, is prepared in another container fitted with a stirrer (pre-emulsifier). When the contents of the reactor have reached a temperature of 81° C., 6.22 g of a 36% solids polystyrene seed with 30 nm particle size and then 60 g of a 7% sodium persulfate solution are added.

About two minutes after having added the initiators, the portion of the monomer pre-emulsion and 230 g of a 7% sodium persulfate solution, 107 g of a sodium acetate 6% solution, are fed into the reactor at a constant feed rate, over a period of 3 hours, taking care to keep the contents of the reactor at a temperature of 84-86° C. throughout all the introduction.

Then, the reaction mass is maintained at 84-86° C. for a further 30 minutes, then 133 g of 13% tert-butyl hydroperoxide solution and 100 g of a 20% sodium metabisulfite solution are feed separately into the reactor at 66° C. over a period of 60 minutes at constant rate.

Ten minutes after the end of the above addition, the product obtained is cooled to 35° C., the pH is corrected with sodium hydroxide up to pH 4.0-5.0. Then, the mixture is filtered through a screen of 36 mesh. The solids content of the dispersion is set between 55-57%.

Example 2 (Comparative)

The polymerization of example 1 is repeated but preparing the pre-emulsion by replacing the monomeric composition with that of row 2 in table 2.

Example 3 (Invention)

The polymerization of example 1 is repeated but preparing the pre-emulsion replacing the monomeric composition with that of row 3 in table 2.

Example 4 (Invention)

The polymerization of example 1 is repeated but preparing the pre-emulsion replacing the monomeric composition with that of row 4 in table 2.

Example 5 (Invention)

The polymerization of example 1 is repeated but preparing the pre-emulsion replacing the monomeric composition with that of row 5 in table 2.

Example 6 (Invention)

The polymerization of example 1 is repeated but preparing the pre-emulsion replacing the monomeric composition with that of row 6 in table 2.

Example 7 (Invention)

The polymerization of example 1 is repeated but preparing the pre-emulsion replacing the monomeric composition with that of row 7 in table 2.

The monomeric composition of each examined aqueous polymer dispersion as prepared according to the above disclosed examples, is shown comparatively in the below table 2.

TABLE 2 monomeric compositions of the aqueous polymer dispersions as prepared according to the above examples

| | EHA | MMA | AE | BMA | VA | S | HEMA | AA | n-DM |
|---|---|---|---|---|---|---|---|---|---|
| Ex-1 (comparative) | 89.0 | 4.3 | 0 | 0 | 5.3 | 0 | 0.8 | 0.6 | 0.11 |
| Ex-2 (comparative) | 89.0 | 0 | 4.3 | 0 | 4.6 | 1.0 | 0.8 | 0.6 | 0.11 |
| Ex-3 (invention) | 88.7 | 0 | 0 | 4.3 | 4.6 | 1.0 | 0.8 | 0.6 | 0.11 |
| Ex-4 (invention) | 88.4 | 0 | 0 | 4.3 | 4.0 | 1.8 | 0.8 | 0.6 | 0.06 |
| Ex-5 (invention) | 88.7 | 0 | 0 | 2.3 | 6.6 | 1.0 | 0.8 | 0.6 | 0.11 |
| Ex-6 (invention) | 88.3 | 0 | 0 | 4.3 | 4.0 | 2.0 | 0.8 | 0.6 | 0.06 |
| Ex-7 (invention) | 87.3 | 0 | 0 | 2.3 | 6.5 | 2.5 | 0.8 | 0.6 | 0.11 |

3) Applicative Adhesive Performances 3.1) Applicative Tests and Conditions Used

The polymer dispersions produced in the above examples have been characterized for their PSA adhesive properties without further formulation (dispersions used as such), for test of peel adhesion, of loop tack and of cohesion, while for cold temperature loop tack test a combination with a tackifier resin (see conditions below) is used.

Peel Adhesion and Loop Tack Test

The polymer dispersions are applied on a PET film and dried at 80° C. for a few minutes in order to obtain the same dry weight per unit area of about 20 g/m$^2$. Once dried, the PET foils are laminated with a siliconized paper (liner). After storing the test strip for 24 hours at 23° C. and 50% Relative Humidity (RH), they were applied on a stainless steel plate and the 180° peel adhesion was tested according to FINAT FTM1 method.

The tack of the applied PSA (loop tack) were tested according to FINAT FTM9 method.

Cohesion Test

On the test strip prepared in the same way as for the peel adhesion test, is also measured the shear strength as a measure of cohesion according to test FINAT FTM 7 method.

Cold Temperature Loop Tack Test on Paper Strips 84 weight parts on solids of the aqueous polymer dispersions of the above examples are compounded with 16 weight parts of solids of Takolyn 3519 (tackifier resin). Then, these compounds were applied on siliconized paper film (liner) and dried at 80° C. for few minutes, once the adhesives films were completely dry on the liner, they have been laminated with a sheet of paper. Then, some strips 1-inch-wide have been casted from this foils. After storing, these test paper strips for 24 h at 23° C. and 50% RH, the loop tack has been carried out by using a dynamometer with a cold box set at −10° C., after conditioning the strips for at least 10' in the box before starting the test.

3.2) Applicative Results

The results of the above tests are shown in point 3.2) and tables 3 and 4 below.

TABLE 3 applicative results of the aqueous polymer dispersion of the examples applied on PET without any tackifier addition

| | Tg in ° C. | Peel (24 h SS) in N/25 mm | Peel (24 h PE) in N/25 mm | Loop Tack (24 h SS) in N | Loop Tack (24 h PE) in N | Shear in h |
|---|---|---|---|---|---|---|
| Ex-1 (comparative) | −54 | 11.0 A/C | 11.3 A/C | 10.0 | 9.0 | 30 |
| Ex-2 (comparative) | −53 | 11.9 C | 10.6 C | 13.4 | 9.3 | 6 |
| Ex-3 (invention) | −56 | 11.1 A/C | 10.9 A/C | 9.7 | 9.8 | 140 |
| Ex-4 (invention) | −55 | 10.6 A/C | 10.2 A/C | 9.7 | 7.3 | 400 |
| Ex-5 (invention) | −54 | 10.6 A/C | 10.2 A/C | 9.7 | 7.3 | 94 |
| Ex-6 (invention) | −55 | 12.9 A/C | 12.2 A/C | 10.8 | 9.8 | 63 |
| Ex-7 (invention) | −53 | 11.1 C | 11.4 A/C | 13.3 | 9.9 | 14 |

A = adhesive separation

C = cohesive separation

TABLE 4

Loop tack results on PE at low temperature, with PSA compositions obtained from the aqueous polymer dispersion of the examples, compounded with tackifier resin and applied on paper

| | Loop Tack Cold PE (−10° C.) in N |
|---|---|
| Ex-1 (comparative) | 0.5 |
| Ex-2 (comparative) | 1.0 |
| Ex-3 | 1.1 |
| Ex-4 | 1.5 |
| Ex-5 | 2.0 |
| Ex-6 | 1.6 |
| Ex-7 | 1.7 |

The invention claimed is:

1. A pressure sensitive adhesive composition, comprising an aqueous polymer dispersion with said polymer comprising monomeric units from the polymerization of a monomeric composition comprising:

a) 75 to 95% by weight of 2-ethylhexyl acrylate, b) 2 to 10% by weight of butyl (meth)acrylate, c) 0.5 to 3% by weight of styrene, d) 0.1 to 2% by weight of (meth)acrylic acid, e) 0 to 8% by weight of vinyl acetate, f) a monomer different from a), b), c), d) and e) as defined above, said monomer f) comprising hydroxy ethyl acrylate and/or hydroxy ethyl methacrylate, g) 0.005% to 0.2% by weight with respect to the total weight of monomers a)+b)+c)+d)+e)+f) of at least one chain transfer agent selected from mercaptans, the sum of a)+b)+c)+d)+e)+f) being equal to 100% and with the proviso that said monomeric composition does not comprise any C1-C2 alkyl (meth)acrylate or any monomer containing sulfonic groups or any polymerizable surfactant or any diester of an unsaturated dicarboxylic acid, wherein the pressure sensitive adhesive compositoin has a loop tack of 1.1 N or greater when used at −10° C.

2. The pressure sensitive adhesive composition according to claim 1, wherein said transfer agent g) is n-dodecyl mercaptan.

3. The pressure sensitive adhesive composition according to claim 1, wherein said transfer agent g) is present at a content of from 0.005 to 0.2% by weight.

4. The pressure-sensitive adhesive composition according to claim 1, wherein said composition comprises:

A) 60-95 parts by weight of said aqueous polymer dispersion as defined according to claim 1, and B) 5-40 parts by weight of at least one tackifier resin, and optionally C) 0-10 parts by weight per 100 parts of A)+B) of additives selected from the group consisting of wetting agents, thickeners, preferably associative thickeners, defoamers, crosslinkers fillers, colorants, leveling agents, plasticizers, and pigments.

5. A pressure sensitive self-adhesive article comprising the pressure-sensitive adhesive composition as defined according to claim 1.

6. The pressure sensitive self-adhesive article according to claim 5, which is an adhesive label, adhesive tape or adhesive film.

7. The pressure sensitive self-adhesive article according to claim 6, wherein said adhesive label is a paper adhesive label.

* * * * *